C. H. PERRY.
SPRINKLER HEAD.
APPLICATION FILED DEC. 17, 1914.
1,165,202.
Patented Dec. 21, 1915.
2 SHEETS—SHEET 1.
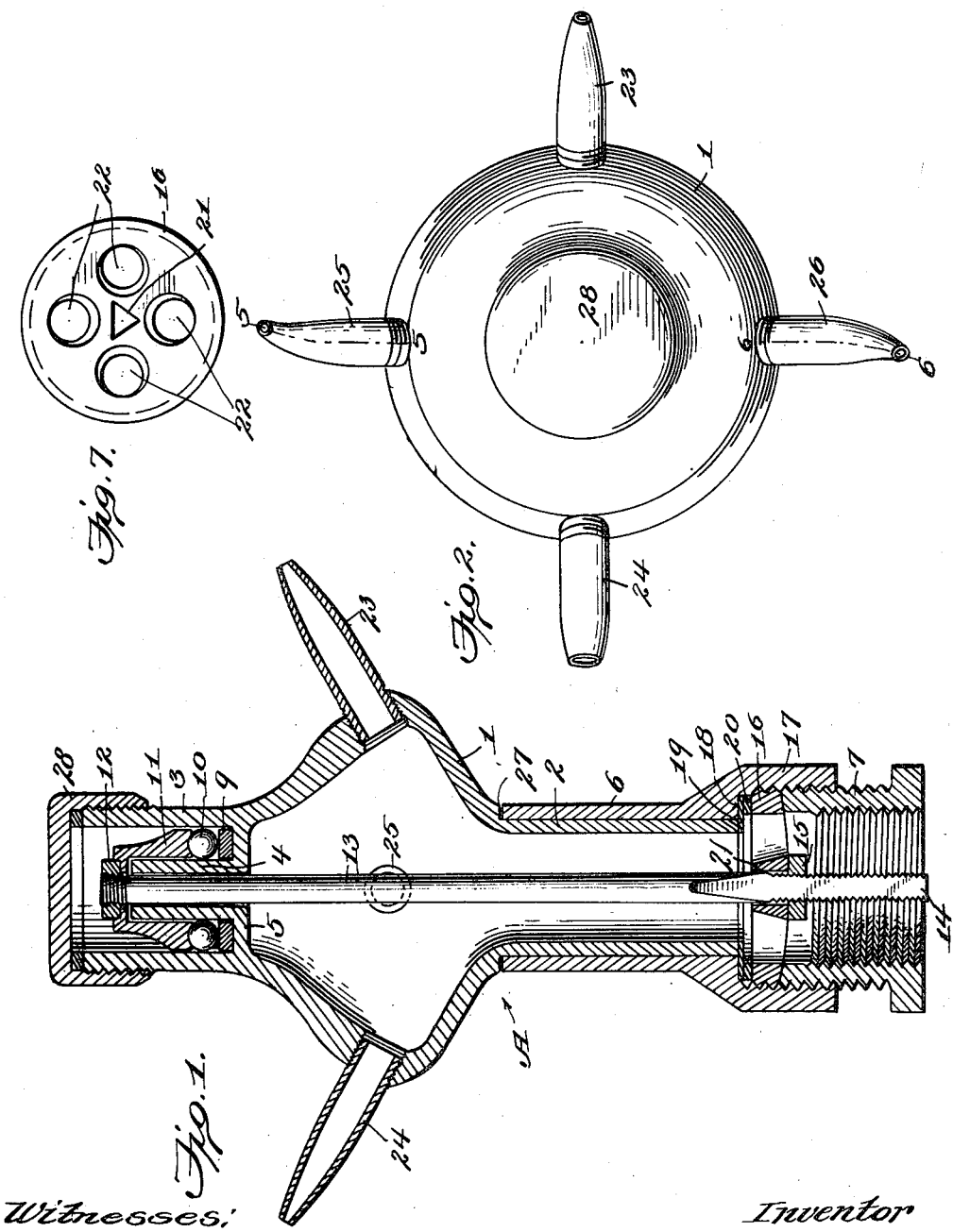
Witnesses:
Inventor
Charles H. Perry,
by
Attorney

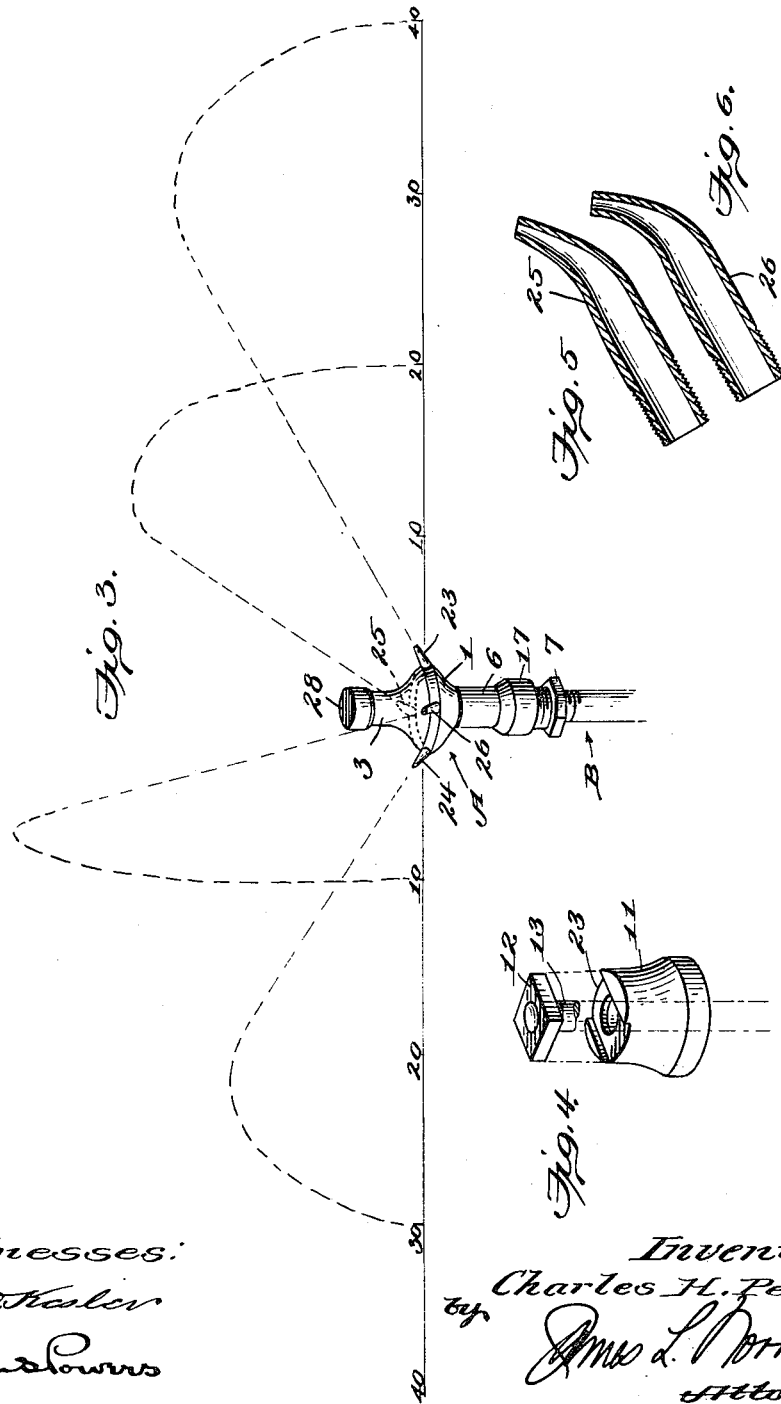

UNITED STATES PATENT OFFICE.

CHARLES H. PERRY, OF MIAMI, FLORIDA.

SPRINKLER-HEAD.

1,165,202.  Specification of Letters Patent.  Patented Dec. 21, 1915.

Continuation in part of application Serial No. 819,504, filed February 18, 1914. This application filed December 17, 1914. Serial No. 877,723.

*To all whom it may concern:*

Be it known that I, CHARLES H. PERRY, a citizen of the United States, residing at Miami, in the county of Dade and State of Florida, have invented new and useful Improvements in Sprinkler-Heads, of which the following is a specification.

This invention relates to improvements in sprinkler heads for use more particularly in irrigation operations wherein relatively large tracts of land are to be irrigated from time to time to promote the growth of agricultural products.

Irrigation by the ditch system is wasteful of water and the system itself is unwieldy and has many undesirable features. The objections to the other, *i. e.* the sprinkler system of irrigation, are its great intrinsic cost and the waste (relative) of water, due to loss by evaporation and the high pressure normally required to effect operation of the sprinklers.

The present invention while concerned with an irrigating sprinkler, *per se*, has been originated with the object of providing a sprinkler which will insure the practicability and desirability of sprinkler irrigation systems by reducing the intrinsic cost of such systems to a minimum, owing to the relatively small number of sprinklers required to irrigate a given area and the relatively low intrinsic cost of each sprinkler, by substantially reducing the upkeep cost of such systems, owing to reduction of the force of the water required for operations of the sprinkler heads and to reduction of the losses by evaporation, and by increasing the efficiency of such systems, owing to the thorough and uniform irrigation or saturation of all the ground to be served by the system and to the construction of the sprinkler heads whereby they cannot become deranged.

With the above objects in view, the essential operative characteristics of a sprinkler head in accordance with the invention are the relatively great radius, through which an irrigating stream of maximum length may be projected, the irrigation of all the ground measured by said radius, the steadiness, volume, and force of the projected streams and the relatively low water pressure required for the operation of the sprinkler head. These operative characteristics are assured by virtue of the fact that the improved sprinkler head rotates very slowly but with perfect freedom, is self-regulating as to its speed of rotation, requiring no governor or equivalent agency, and projects a plurality of streams, each covering a definite zone of said radius. To insure the requisite slowness of rotation with a low pressure of water as the motive source it is preferred to provide an upper bearing of the same or substantially the same construction as that which is disclosed in my pending application, Serial No. 819,504 and the present application, in so far as it includes claims which specifically refer to said bearing in terms applicable to the upper bearing disclosed in my said pending application is, for the purposes of said claims, to be regarded as a continuation of my said pending application.

The above and other objects and advantages will appear as the description proceeds.

An embodiment of the invention is disclosed in the accompanying drawings, wherein:—

Figure 1 is a vertical sectional view of a sprinkler head in which the features of the invention are incorporated; Fig. 2 is a top plan view thereof; Fig. 3 is a diagrammatic view illustrating the manner in which the streams from the sprinkler head cover all the ground measured by the radius of the longest stream; Fig. 4 is a perspective view showing details of the upper bearing; Figs. 5 and 6 are detail sectional views showing the "driving" nozzles, these views being taken along the lines 5—5 and 6—6 of Fig. 2 or more strictly along the inclined or angular axes of said nozzles; and Fig. 7 is a detail view of an element of the connections between the sprinkler head and its supporting sleeve.

Similar characters of reference designate corresponding parts throughout the several views.

The improved sprinkler comprises a hollow rotatable body A which is formed with an enlarged water distributing chamber 1, with a hollow cylindrical journal 2 projecting from the lower end of said chamber, and with an extension 3 projecting from the upper end of said chamber and serving as the outer wall of the housing of the upper bearing against which the body A rotates. The said housing is completed by an inner annular wall 4 concentric to the wall 3 and an annular base 5 connecting the walls 3 and 4. The journal 2 fits within a stationary sleeve 6 which at its lower end carries a nut 7, or equivalent device, for connecting the sprinkler to the upright water-conducting pipe B, (Fig. 3), by which the sprinkler is supported at a suitable elevation above the ground.

The upper bearing against which the body A rotates consists of a suitable wear ring 9 imposed upon the base 5, anti-friction balls 10 arranged upon the ring 9 and taking up substantially the width of the space between the walls 3 and 4, and a cone 11 imposed upon the balls 10 and having its under face grooved to provide a recess for said balls. The cone 11 resists the upward thrust of the body A under the pressure of the water admitted into said body through the journal 2 and for this purpose the upper end of said cone engages a nut or equivalent stop 12 secured upon the upper end of a rod 13 which extends through the journal 2, the chamber 1 and the annular wall 4 of the bearing housing. The rod 13 projects at its lower end for some distance into or through the nut 7 and its projecting lower portion 14 is of flat-sided, e. g. triangular, cross-section, being threaded at the apices of its flat sides. A nut 15 is mounted upon the threaded portion 14 of the rod 13 and bears against a plate 16 which is fitted in the lower bell mouth 17 of the sleeve 6, the nut 15 thus serving to hold the rod 13, and therewith the cone 11, against upward play. The plate 16 is preferably threaded in the bell mouth 17 in order that it may not be subject to upward play or displacement consequent to the water pressure in the body A, as would be the case if the nut 16 were merely loosely fitted in the bell mouth 17. At the junction of the body of the sleeve 6 and its bell mouth 17, an internal annular shoulder 18 is provided which is substantially flush with the lower end of the journal 2 and the annular space between the sleeve 6 and the journal 2 is normally closed by a flexible washer 19 which acts in analogy to a valve and has a width equal to the combined width of the shoulder 18 and the lower end of the journal 2, said washer being fitted against said shoulder and lower end of said journal. Another washer 20 is preferably interposed between the plate 16 and the valve washer 19. The plate 16 has a central opening 21 for the passage therethrough of the rod 13 and the said opening conforms to the flat-sided cross-section of the projecting lower portion 14 of said rod. The plate 16 is also provided with other openings 22 through which water from the pipe 8 may pass into the journal 2. The cone 11 preferably has its upper face recessed or channeled as at 23 to provide a seat for the nut 12, whereby said nut may be held against rotation relative to said cone. The plate 16 performs a similar office for the rod 13, the flat-sided opening 21 of said plate, by virtue of its conformation to the flat-sided lower portion 14 of said rod, preventing rotation of the rod relative to the nuts 12 and 15.

The sprinkler head is completed by a plurality of nozzles of which four are employed in the embodiment disclosed, these nozzles being indicated at 23, 24, 25 and 26. An important characteristic of the present sprinkler head is that each nozzle projects a stream of different length and the nozzles are so arranged and constructed that all of the projected streams cover all of the ground measured by the radius of the longest stream. It has been found practical for the longest stream to extend over a radius of forty feet and the longest stream is projected by the nozzle 23. As the stream projected by the nozzle 23 falls, it covers approximately the last ten feet of said radius. Thus, the longest stream will irrigate a zone approximately ten feet wide and thirty feet distant from the sprinkler head. The next longest stream is projected by the nozzle 24 and irrigates a zone approximately ten feet wide and twenty feet distant from the sprinkler head. The third longest stream is projected by the nozzle 25 and irrigates a zone approximately ten feet wide and ten feet distant from the sprinkler head, and the shortest stream irrigates a zone approximately ten feet wide and having the sprinkler head at its center. This will be clearly apparent from the diagram shown in Fig. 3. Two of the nozzles are used as "driving" nozzles, and accordingly have the terminals of their water passages directed laterally at a suitable angle. It is preferred to use the nozzles 25 and 26 as driving nozzles.

The nozzle 23 which projects the longest stream has a perfectly straight axis. The nozzle 24 which projects the next longest stream also has a straight axis but its discharge end is somewhat flattened and is of substantially greater width than the discharge end of the nozzle 23 in order that the stream discharged by the nozzle 24 may be wider and, hence, of less carrying power than the stream discharged by the nozzle 23. The nozzles 25 and 26, (Figs. 5 and 6), are made to discharge streams of shorter length than the nozzles 23 and 24 by suitably up-turning the ends of their discharge passages whereby the streams which they discharge, will be projected upwardly at a substantially greater angle than the streams discharged by the nozzles 23 and 24. The stream discharged by the nozzle 25, (Fig. 4), is longer than the stream discharged by the nozzle 26 because the end of the discharge passage of the nozzle 25 is not up-turned to the same extent as the end of the discharge passage of the nozzle 26, (Fig. 6).

The nozzles may be of any desired length but in order to insure the efficient balance of the sprinkler head, it is requisite that each two oppositely disposed nozzles should be of the same length. Preferably, however, all four of the nozzles are of the same length.

In setting up the sprinkler head the nut 15 is tightened sufficiently to insure that the clearance between the upper end of the sleeve 6 and the shoulder 27 provided at the lower side of the distributing chamber 1 and overhanging said sleeve, shall be very slight and merely of sufficient degree to insure the free rotation of the body A relative to the sleeve 6. The upper bearing is packed with a suitable lubricant and is preferably closed by a cap 28. The water entering the chamber 1 through the journal 2 exerts an upward pressure on the body A, which pressure is resisted by the cone 11 and the body A thus rotates against said cone. Notwithstanding the upward pressure referred to, the body A will rotate with perfect freedom and, hence, under very slight motive power, this result being insured by the provision of the anti-friction rollers 10 which transmit the upward thrust of the body A to the cone 11. Owing to the freedom with which the body A rotates and the slight motive power required to effect such rotation, it is practical to rotate the body A at a very low speed and to produce such rotation by a relatively low pressure of water. The speed of rotation of the body A under a given pressure of water depends upon the lateral angle of the discharge ends of the nozzles 25 and 26, and where a slow rotation of said body is desired, (and such a slow rotation is most conducive to the best practical results), the lateral angle of the discharge ends of the nozzles 25 and 26 is very slight, as will be evident from Fig. 2.

Owing to the extreme slowness of the rotation of the body A, the streams discharged by the nozzles 23 and 24 have an almost negligible tangential or lateral displacement and are nearly as straight and, hence, nearly as long, as they would be were the body A held stationary. For this reason, it is practical, with the sprinkler head described, to produce streams of much greater length, steadiness and concentrated volume than is produced by the ordinary sprinkler head. The differentiation of the streams from one another is secured by the differences above described in the construction and arrangement of the various discharge nozzles. It is preferred to use the nozzles which discharge the shorter streams as driving nozzles because the slightly tangential discharge of the streams from the driving nozzles aids the short carrying power of said streams which it is one of the objects of the invention to insure and at the same time does not reduce the maximum stream length of the sprinkler head, as would be the case were the nozzles which are designed to discharge the streams of greatest length used as driving nozzles. In other words, where it is objective to reduce the length of two of the projected streams relatively to the length of the other two streams, and where it is also objective to use two of the nozzles as driving nozzles, it is advantageous to construct the nozzles which are designed to discharge the shorter streams as driving nozzles, since the construction of a particular nozzle as a driving nozzle reduces the length of the stream which said nozzles project owing to the tangential direction of such stream.

From the foregoing description, it will be seen that in practical use the sprinkler head body rotates with extreme slowness under a relatively low pressure of water; that its longest stream has a relatively great length; that all of the streams irrigate all of the land measured by the radius of the longest stream; that all of the streams are uniform, steady and of concentrated volume; and that the land measured by the radius of the longest stream is not only covered by all of the streams, but, owing to the slowness of the rotation of the sprinkler head, is thoroughly irrigated in a minimum length of time and with a minimum loss of water.

The upper bearing above described not only insures the freedom of rotation, in spite of the upward thrust of the body A, whereby said body may be rotated very slowly with a minimum water pressure, but it also insures the accurate centering of said body and the uniform rotation thereof.

Having fully described my invention, I claim:—

1. An irrigating sprinkler head comprising a rotatable body having a water inlet at its lower end, a water distributing chamber arranged above said inlet, water discharge nozzles projecting from said chamber, an annular bearing base arranged above said chamber and forming the upper wall thereof, and inner and outer concentric bearing walls projecting upwardly from said base, a cupped bearing member arranged over said base and projecting into the space between said bearing walls, anti-friction rollers interposed between said base and said bearing member, a rod arranged within said body, means for fixing said rod against upward movement, and means at the upper end of said rod to engage said bearing member and hold the latter against upward thrust.

2. An irrigating sprinkler head comprising a rotatable body having a tubular journal at its lower end providing a water inlet, a water distributing chamber arranged above said journal and receiving water therefrom, water discharge nozzles projecting from said chamber, and an annular bearing base arranged above said chamber and forming the upper wall thereof, a bearing member arranged over said base, anti-friction rollers interposed between said base and said bearing member, a sleeve closely surrounding said journal and having a projecting portion below said journal and an internal annular shoulder substantially co-planar with the lower face of said journal, a washer covering the co-planar faces of said shoulder and journal, a perforate plate confining said washer, a rod passing through said plate, said rotatable body and said bearing member, a nut on said rod engaging the under side of said plate, and another nut on said rod engaging the upper side of said bearing member and holding the latter against upward thrust.

3. An irrigating sprinkler head comprising a rotatable body having a tubular journal at its lower end providing a water inlet, a water distributing chamber arranged above said journal and receiving water therefrom, water discharge nozzles projecting from said chamber, and an annular bearing base arranged above said chamber and forming the upper wall thereof, a bearing member arranged over said base, anti-friction rollers interposed between said base and said bearing member, a sleeve closely surrounding said journal and having an internally threaded projecting portion below said journal and an internal annular shoulder substantially co-planar with the lower face of said journal, a washer covering the co-planar faces of said shoulder and journal, a perforate plate confining said washer, and having threaded engagement in the projecting portion of said sleeve, a rod passing through said plate, said rotatable body and said bearing member, a nut on said rod engaging the under side of said plate, and another nut on said rod engaging the upper side of said bearing member and holding the latter against upward thrust.

4. An irrigating sprinkler head comprising a rotatable body having a cylindrical journal at its lower end providing a water inlet, a bearing base near its upper end, a water distributing chamber intermediate said inlet and base and into which the water directly flows from said inlet and water discharge nozzles projecting from said chamber, a fixed sleeve surrounding said journal, means at the lower end of said journal for closing the space between said journal and sleeve against the access of water, a bearing member arranged over said base and fixed against upward thrust, and anti-friction rollers interposed between said base and said bearing member.

5. An irrigating sprinkler head comprising a rotatable body having a water inlet at its lower end, a bearing base near its upper end, a water distributing chamber intermediate said inlet and base and into which the water directly flows from said inlet and water discharge nozzles projecting from said chamber, a bearing member arranged over said base and fixed against upward thrust and anti-friction rollers interposed between said base and said bearing member, all of said nozzles projecting streams of different length whereby to cover all of the ground measured by the radius of the longest stream, and two of the nozzles which project streams of shorter length and are arranged at opposite points of the distributing chamber being formed as driving nozzles and having the extremities of their discharge passages laterally inclined.

6. An irrigating sprinkler head comprising a rotatable body having a water inlet at its lower end, a bearing base near its upper end, a water distributing chamber intermediate said inlet and base and into which the water directly flows from said inlet and water discharge nozzles projecting from said chamber, a bearing member arranged over said base and fixed against upward thrust and anti-friction rollers interposed between said base and said bearing member, all of said nozzles projecting streams of different length whereby to cover all of the ground measured by the radius of the longest stream, and two of the nozzles which project streams of shorter length and are arranged at opposite points of the distributing chamber, being formed as driving nozzles and having the extremities of their discharge passages laterally inclined, the other nozzles having radially straight discharge passages.

7. An irrigating sprinkler head comprising a rotatable body having a water inlet at its lower end, a bearing base near its upper end, a water distributing chamber intermediate said inlet and base and into which the water directly flows from said inlet and water discharge nozzles projecting from said chamber, a bearing member arranged over said base and fixed against upward thrust and anti-friction rollers interposed between said base and said bearing member, all of said nozzles projecting streams of different length whereby to cover all of the ground measured by the radius of the longest stream, and two of the nozzles which project streams of shorter length and are arranged at opposite points of the distributing chamber being formed as driving nozzles and having the extremities of their discharge passages laterally inclined, the other nozzles having axially and radially straight discharge passages and one of them having a flattened discharge extremity.

8. An irrigating sprinkler head comprising a rotatable body having a water inlet at its lower end, a bearing base near its upper end, a water distributing chamber intermediate said inlet and base and into which the water directly flows from said inlet and water discharge nozzles projecting from said chamber, a bearing member arranged over said base and fixed against upward thrust and anti-friction rollers interposed between said base and said bearing member, all of said nozzles projecting streams of different length whereby to cover all of the ground measured by the radius of the longest stream, and two of the nozzles which project streams of shorter length and are arranged at opposite points of the distributing chamber being formed as driving nozzles and having the extremities of their discharge passages laterally and differentially upwardly inclined, the other nozzles having axially and radially straight discharge passages and one of them having a flattened discharge extremity.

9. An irrigating sprinkler head comprising a rotatable body having a distributing chamber provided with discharge nozzles and having a tubular journal communicating with the lower end of said distributing chamber, the said body being subject to the upward pressure of water passing into said distributing chamber from said journal, a sleeve inclosing the journal and having an internal shoulder substantially co-planar with the lower face of the journal, a washer lying against said shoulder and said lower face of the journal, a plate fitted in the lower portion of said sleeve and confining the said washer, and means held against upward thrust by said plate for, in turn, holding said rotatable body against upward thrust consequent to the upward pressure of the water.

10. An irrigating sprinkler head comprising a rotatable body having a distributing chamber provided with discharge nozzles and having a tubular journal communicating with the lower end of said distributing chamber, the said body being subject to the upward pressure of water passing into said distributing chamber from said journal, a sleeve inclosing the journal and having an internal shoulder substantially co-planar with the lower face of the journal, a washer lying against said shoulder and said lower face of the journal, a plate fitted in the lower portion of said sleeve and confining the said washer, and means held against upward thrust by said plate for, in turn, holding said rotatable body against upward thrust consequent to the upward pressure of the water, such means including a bearing member for said rotatable body arranged above the distributing chamber of said body.

11. An irrigating sprinkler head comprising a rotatable body having a distributing chamber provided with discharge nozzles and having a tubular journal communicating with the lower end of said distributing chamber, the said body being subject to the upward pressure of water passing into said distributing chamber from said journal, a sleeve inclosing the journal and having an internal shoulder substantially co-planar with the lower face of the journal, a washer lying against said shoulder and said lower face of the journal, a plate having threaded engagement in the lower portion of said sleeve and confining the said washer, and means held against upward thrust by said plate for, in turn, holding said rotatable body against upward thrust consequent to the upward pressure of the water.

12. An irrigating sprinkler head comprising a rotatable body having a distributing chamber provided with discharge nozzles and having a tubular journal communicating with the lower end of said distributing chamber, the said body being subject to the upward pressure of water passing into said distributing chamber from said journal, a sleeve inclosing the journal and having an internal shoulder substantially co-planar with the lower face of the journal, a washer lying against said shoulder and said lower face of the journal, a plate having threaded engagement in the lower portion of said sleeve and confining the said washer, and means held against upward thrust by said plate for, in turn, holding said rotatable body against upward thrust consequent to the upward pressure of the water, such means including a bearing member for said rotatable body arranged above the distributing chamber of said body.

13. An irrigating sprinkler head comprising a rotatable body having a cylindrical journal at its lower end providing a water inlet and having a water distributing chamber provided with water discharge nozzles, said body also having a concentric annular bearing base, a fixed sleeve surrounding said journal, means at the lower end of said journal for closing the space between said journal and said sleeve against the access of water, a bearing member external to said distributing chamber and fixed over said base against upward thrust, and anti-friction rollers interposed between said base and said bearing member.

In testimony whereof I have hereunto set my hand in presence of two subscribing witnesses.

CHARLES H. PERRY.

Witnesses:
  JAMES L. NORRIS,
  JOHN S. POWERS.